(No Model.)  2 Sheets—Sheet 1.

J. H. FENTON.
QUARTER BOOT.

No. 342,790. Patented June 1, 1886.

Witnesses:
Albert H. Adams.
O. W. Bond.

Inventor:
John H. Fenton (No Model.)
J. H. FENTON.
QUARTER BOOT.
No. 342,790. Patented June 1, 1886.
2 Sheets—Sheet 2.
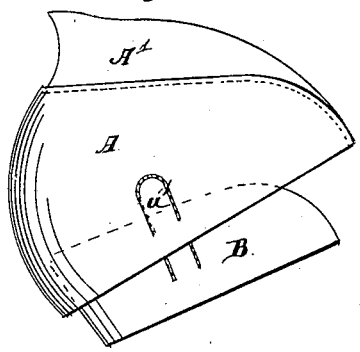
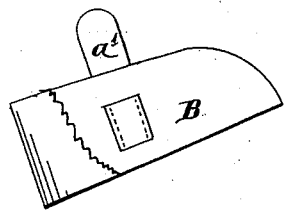
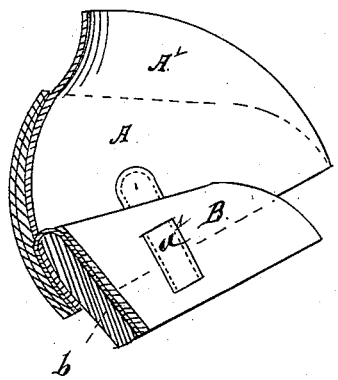
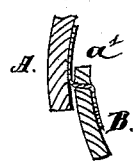
Witnesses:
Albert H. Adams
O. W. Bond
Inventor:
John H. Fenton

UNITED STATES PATENT OFFICE.

JOHN H. FENTON, OF CHICAGO, ILLINOIS.

QUARTER-BOOT.

SPECIFICATION forming part of Letters Patent No. 342,790, dated June 1, 1886.

Application filed September 24, 1885. Serial No. 178,057. (No model.)

*To all whom it may concern:*

Be it known that I, JOHN H. FENTON, residing at Chicago, in the county of Cook and State of Illinois, and a citizen of the United States, have invented a new and useful Improvement in Quarter-Boots, of which the following is a full description, reference being had to the accompanying drawings, in which—

Figure 1:
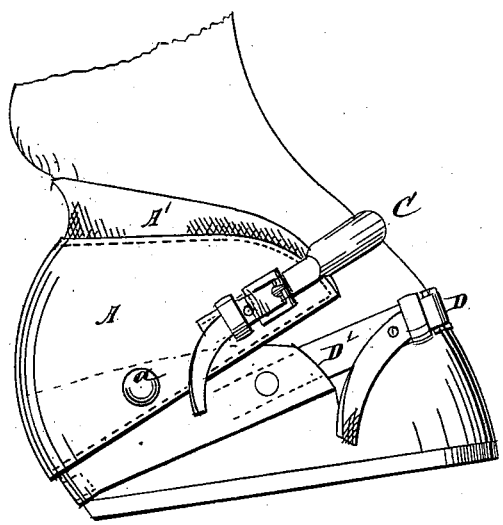
Figure 2:
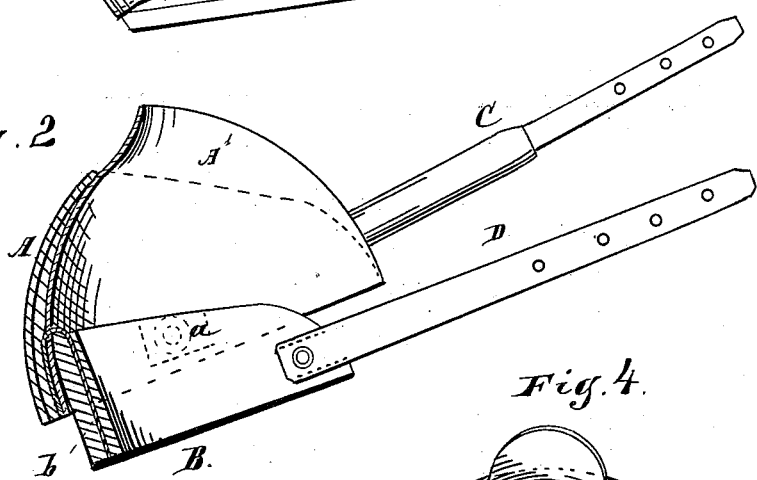
Figure 3:
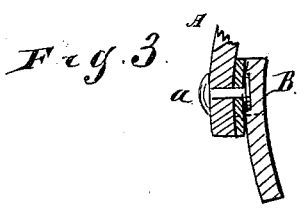
Figure 4:
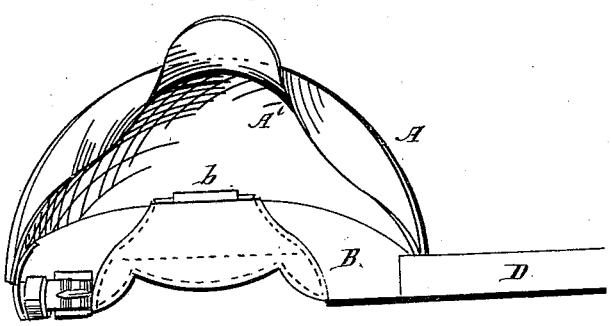

Figure 1 is a side elevation showing the boot in position on the hoof and a pivot-hinge; Fig. 2, a sectional elevation of the boot of Fig. 1; Fig. 3, a detail showing the pivotal connection; Fig. 4, a rear elevation of the boot; Fig. 5, a side elevation showing a strap-hinge; Fig. 6, a side elevation of the lower portion, partly broken away to show the strap-hinge; Fig. 7, a sectional elevation of the boot of Fig. 1; Fig. 8, a detail showing the strap-hinge.

It is common to use quarter-boots on the front feet of horses, for the purpose of protecting the same from injury by being struck by the hindmost feet of the horse while in motion.

As heretofore constructed, quarter-boots have been made in a single piece, and have also been made in sections; but all such boots as heretofore constructed seem to lack some of the essential effects requisite to a perfect boot. The rigidity of a boot formed in a single piece, not working with the motion of the joint, often chafes the same, and the quarter-boots formed in sections, as heretofore constructed, have had their different parts combined in such a way as not to afford ample protection for the hoof at all times, or have not worked in perfect conformity with the joint, owing to the fact that such sectional boots have been combined at the rear parts thereof, whereas the joint of a horse works from the center.

The object of this invention is to overcome the objections existing in quarter-boots as heretofore constructed, and to give the animal perfect liberty of action, and at the same time afford ample protection to the hoof from injury or from the chafing of the boot; and its nature consists in making a boot in two sections, one being attached or hinged to the other at the sides at such distances from the front and rear parts of the boot so as to enable the same to work in harmony with the action of the joint, so that the lower section will be held firmly in place, while the upper section is free to work or move as required by the motion of the animal's foot, and in the several parts and combinations of parts hereinafter described, and pointed out in the claims as new.

In the drawings, A represents the upper section of the boot, made of leather or other suitable material, and having, as shown, a lining or interior, A', of some soft material, to go next to the limb.

B is the lower section of the boot, also made of leather or other suitable material. This section has hinged or jointed thereto on each side by suitable rivets or pivots, *a*, the section A, as shown in Fig. 3, and by dotted lines in Fig. 2, the hinge being somewhat back of the free edges of the section, so as to give the upper part plenty of play to rise and fall. The sections A B are molded or otherwise formed into shape to fit around the hoof, and, as shown, the lining A' extends some distance above the upper part of A, so as to fit around the pastern-joint just above the hoof. The free edges of the sections A B, at the rear, are connected together by a strap, *b*, of rubber or other elastic material, by which the section A will be returned to its former position after being moved.

C is a strap attached at one end to one side of the section A, and having its other end provided with holes to receive the tongue of a buckle attached to the other side of the section A; D, a strap attached at one end to one side of the section B, having its other end provided with holes to receive the tongue of the buckle attached, as shown, to the end of a strap, D', secured to the other side of section B. These straps C D D' with the buckles furnish the means for securing the boot in position on the animal's foot, as usual.

Instead of rivets or pivots *a*, small straps *a'* can be used, as shown in Figs. 5, 6, 7, and 8, for connecting the sections A and B at the sides. If of leather or other flexible material, such straps can be attached to the interior portion of section B and passed through a slot or hole near the top to the outer part thereof and again attached to the interior part of section A; but if of metal the connecting-straps may be placed on the exterior of section B and attached to the interior of section A, that in each case the side connecting-straps cannot be reached by a blow from the hoof, and serve to support or carry the weight of section A, thus removing the weight thereof from the pastern-joint.

In use the quarter-boot is secured to the foot by the straps C D in the usual manner, and when in position the section B rests at the heel upon the projections of the shoe, and the animal is free to throw his foot without disturbing the same, as the section A is free to move or work on the hinges or pivots as the joint of the leg works or moves, and at the same time this working or moving of the section A does not affect its relative position on the foot, as it is maintained in position by its connection through the hinges or pivots with the section B, and it will be returned to its former position by the action of the elastic connection $b$, so that the full benefit arising from the wearing of the boot will be without any serious discomfort to the animal and without any irritable effects or the liability of becoming misplaced, as the section B is on the hoof, where it is not affected by the movements of the joint nor by the movements of section A being hinged thereto, as such section simply works or moves on its pivotal points or hinges without disturbing section B.

I am aware that quarter-boots have been constructed in two parts, said pieces being attached to each other in various ways; but I am not aware that any boots have been constructed in the manner described—viz., hinged at the sides, and with an elastic strap with which to restore the upper part of the boot to its original or former position and maintain the same in its relative position with the hoof.

What I claim as new, and desire to secure by Letters Patent, is—

1. A quarter-boot for horses, consisting of the upper and lower sections, each made to encircle the limb, the lower section being pivoted or hinged at each side to the upper section between the front and rear parts of the sections, substantially as and for the purposes specified.

2. A quarter-boot for horses, consisting of an upper section, A, a lower section, B, and pivots $a$, jointing the lower section to the lower portion of the upper section, substantially as described.

3. A quarter-boot for horses, consisting of the upper and lower sections, A and B, pivoted or hinged together at the sides, and an elastic connection, $b$, between the sections, substantially as described.

JOHN H. FENTON.

Witnesses:
ALBERT H. ADAMS,
O. W. BOND.